April 8, 1969    F. F. EHRICH    3,437,173
GAS TURBINE ENGINE WITH SCREECH ATTENUATING MEANS
Filed Nov. 25, 1966
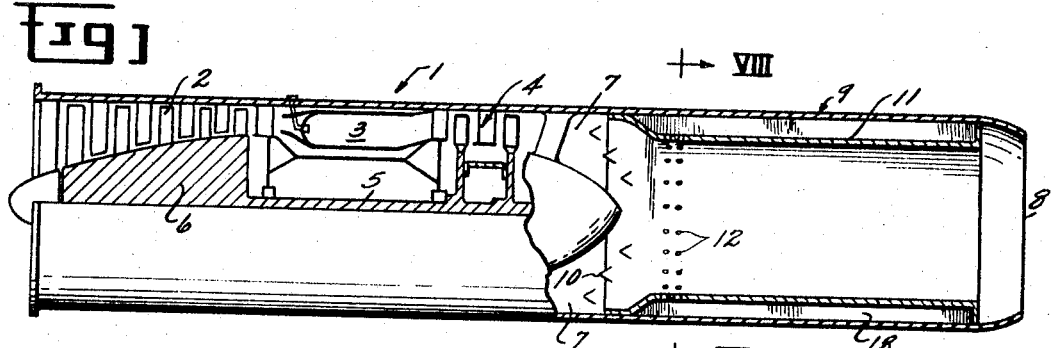
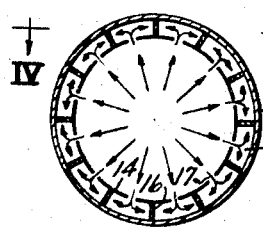 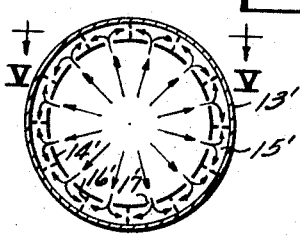 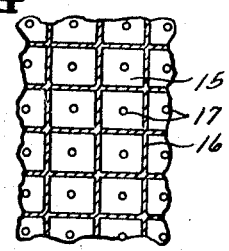
FIGS. 2-7 PRIOR ART
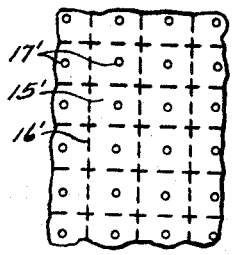 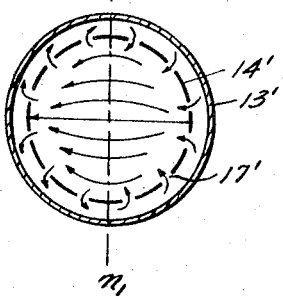 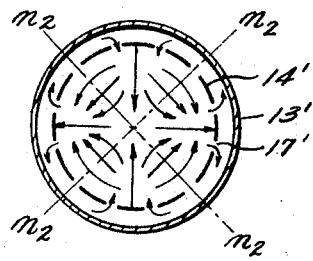
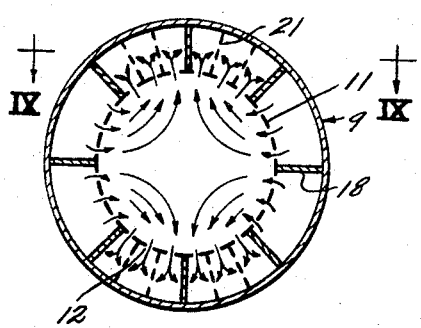 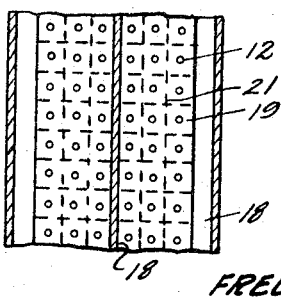
INVENTOR.
FREDRIC F. EHRICH
BY H. F. Manbeck Jr.
ATTORNEY

United States Patent Office 3,437,173
Patented Apr. 8, 1969

3,437,173
GAS TURBINE ENGINE WITH SCREECH ATTENUATING MEANS
Fredric Franklin Ehrich, Marblehead, Mass., assignor to General Electric Company, a corporation of New York
Filed Nov. 25, 1966, Ser. No. 597,121
Int. Cl. F01n 1/00
U.S. Cl. 181—48                                   8 Claims This invention relates generally to gas turbine engines and, more particularly, it relates to means for attenuating or suppressing screech in a jet propulsion system.

As a term of art, "screech" refers to that phenomenon of aerodynamic and combustion instability characterized by intense high frequency pressure oscillations which, under certain conditions, accompany the combustion process in ducted burners, particularly in high performance burners such as ramjets, rockets, main burners, and afterburners or reheat burners. Once screech occurs, it continues until the source of energy which is causing it is removed or until the flow or combustion variables, or both, which are present in the system, are changed or modified to shift the burner operation to a non-screech range. It is necessary in designing combustors to provide means to suppress screech for the high energy oscillations of screech can destroy the burner or, in the case of an afterburner of a jet propulsion engine, render it unsafe.

The problem of how to eliminate or attenuate screech in a jet propulsion system is made difficult for several reasons. One of these reasons is that it is extremely difficult to predict ahead of time the precise flow and combustion conditions which necessarily must exist for screech to occur. The conditions at which screech occurs themselves vary and the precise mechanics of how they function to cause screech are not completely understood. Another reason is that even if it were possible to predict the precise critical flow and combustion conditions which must exist for screech to occur, there is no assurance that the critical conditions so predicted will remain constant, as might be supposed. In fact, these conditions will vary with time and from any given system to other similar systems. In other words, even if the critical flow and combustion variables are accurately determined and controls established to avoid screech, it may yet occur. A slight change in but one of the several operating variables in the system may trigger screech.

Therefore, while it is theoretically and experimentally possible to avoid screech by adusting the flow and combustion variables to a non-screech range, it is not practical to do so because of the changing nature of the variables involved. To avoid screech and the hazards it poses, efforts have therefore concentrated on providing positive structural means which function independently of the variables present in the system.

One such art recognized structural means is the Helmholtz attenuator which is simply a perforated liner that absorbs screech by resonating at the frequency to which it is tuned. Such liners are positioned around the periphery of the combustion zones in jet propulsion systems and tuned to a particular unwanted frequency or frequency band. Each perforation is connected to a tuned chamber or cavity which is defined by either physical partitions between neighboring perforations or by effective walls created at the plane of impact between diffused pressure oscillations emanating from immediately neighboring perforations. Current liner design practice follows this latter method of providing tuned cavities for each perforation and will be discussed in more detail later on in this specification. Suffice it to say for now that each perforation is connected to a tuned cavity which suppresses screech by resonant absorption whether the cavity exists only in effect or as defined physically by walls. The frequency desired to be suppressed, to which liners of the type just decsribed are tuned, is determined by the dimensions of the liner and the size, patterns and location of its perforations.

It should be noted that for each unique frequency of vibration (i.e., pressure oscillation) in a given system, there is an associated unique pattern of displacements and velocities known as its natural mode. Individual liners, therefore, will be tuned to a specific frequency or frequency band with an associated natural mode and will function best when subjected to frequencies of vibration at that natural mode. It has been found in jet propulsion systems that the fundamental natural mode of a given system involving primarily radial motion is most easily suppressed. However, the same combustion instabilities which cause screech in the radial mode also produce them in more complex modes involving transverse motions.

It has been found that while Helmholtz liners designed according to current practice (i.e., having unpartitioned tuned cavities) are successful in suppressing screech at the radial mode, they are less effective in suppressing screech in the transverse mode, even when perfectly tuned. It should be understood in the first place, that where radial mode pressure oscillations are concerned, there is a simultaneous pumping followed by a simultaneous exhausting of pressure oscillations through all the perforations in a liner. Unpartitioned liners are effective so long as pressure vibrations in the radial mode are only involved. This is so because, as pressure vibrations force flow through the perforations the flow is diffused and angularly projected. Since the flow through each perforation is associated simultaneously with flow through other perforations, there is an unavoidable collision between flows emanating from immediately surrounding perforations. In addition to dissipating screech producing energies by the collision, the colliding flows also create planes of impact which, in effect, serve as walls or partitions that effectively define tuned cavities associated with each perforation, thus rendering the unpartitioned liner effective. On the other hand, screech in transverse modes caused by combustion instabilities involves transverse motions in the combustion system which produce non-uniform pressure fluctuations on the liner around its circumference. Where there are differences in pressure along a liner wall, inevitably there will be localized simultaneous pumping and exhausting, and cross flows will exist behind the liner. The existence of cross flows in unpartitioned acoustic liners is incompatible with the creation of effective tuned cavities necessary for such liners to suppress screech. The cross flows will destroy the tuned cavities which would be created only if all the perforations were pumped, then exhausted simultaneously; hence potentially detrimental transverse mode screech will occur.

Therefore, it is an object of this invention to provide improved positive structural screech suppressor means in a jet propulsion system.

It is another object of this invention to improve screech suppressors of the perforated liner type for use in gas turbine engine assemblies.

Another object of this invention is to provide perforated liner screech suppressors for gas turbine engine assemblies capable of effectively functioning to suppress screech in any mode.

Briefly, the invention relates to a screech suppressor arrangement in which an acoustic liner surrounds the periphery of a combustion zone in a jet propulsion system. The liner includes a plurality of perforations arranged in rows around its circumference and a plurality of elongated partitions axially extending between several of the rows. The invention is further characterized by predetermined intervals between the elongated partitions around the circumference of the liner with each partition radially extending from the liner to a duct or casing which contains the liner, thereby forming isolated elongated compartments with the liner and the casing. The compartments thus formed increase the effectiveness of the liners particularly with regard to suppressing transverse mode screech.

The subject matter which is regarded as the invention is particularly pointed out and distinctly claimed in the concluding portion of this specification. The invention, however, both as to organization and method of operation, together with further objects and advantages thereof, may best be understood by reference to the following description taken in conjunction with the accompanying drawings in which:

FIG. 1 is a longitudinal cross sectional view of a jet propulsion system illustrating the use of a screech suppressor means according to the invention.

FIG. 2 is a cross sectional view of a combustion zone in a jet propulsion system showing one previously used form of screech suppressor means.

FIG. 3 is a cross sectional view of a combustion zone in a jet propulsion system showing another previously used form of screech suppresser means.

FIG. 4 is a cross sectional view taken along IV—IV of FIG. 2.

FIG. 5 is a cross sectional view taken along V—V of FIG. 3.

FIGS. 6 and 7 show the same cross sectional view as FIG. 3 under transverse mode conditions.

FIG. 8 is a cross sectional view taken along VIII—VIII of FIG. 1 and shows an improved screech suppressor embodying the present invention.

FIG. 9 is a portion of the cross sectional view taken along IX—IX of FIG. 8.

Referring to FIG. 1, a longitudinal cross sectional view is shown of a gas turbine engine assembly typical of those jet propulsion devices or systems in which the invention may advantageously be utilized. In FIG. 1 the engine is designated generally by the numeral 1, and is of the conventional type including an axial flow compressor 2, a combustor or burner section 3, and a gas turbine assembly 4 in serial flow arrangement with respect to each other, The turbine assembly 4 drives the shaft 5 which, in turn, drives the rotor 6 of compressor 2, hence the compressor and turbine rotate as a unit.

The burner section 3 has fuel fed to it by means, not shown, which is mixed with air and ignited by usual means, likewise not shown, and burned, the combustion fluid passing downstream through turbine assembly 4 into a chamber or duct 7. In a jet engine without afterburner, the duct 7 would discharge directly to the atmosphere through a nozzle 8. Screech normally is not encountered in the burner or duct just described.

In order to augment the thrust of the jet engine 1, additional fuel is burned in an afterburner, which is a combustion zone, defined by a continuation of the duct 7, just described, or in a separate similar duct placed downstream of the turbine assembly 4 and upstream of the exhaust nozzle 8. In FIG. 1 the afterburning duct is shown generally at 9. Extra fuel is fed into duct 9 by any suitable means and ignited by conventional means not shown. Normally afterburners are provided with flameholders 10. As the name implies, the flameholders 10 effectively, by means of the fluid flow pattern created by their insertion in the afterburner, serve to hold the flame and prevent it from passing out through the exhaust nozzle 8 and thus extinguish the combustion in the duct 9.

It has been found that the region just downstream of the flameholders is where screech origiantes and is maintained. As discussed above, screech can be controlled or prevented by changing the various fluid flow parameters. However, varying these parameters does not afford a permanent screech suppressor, since the parameters vary in and of themselves during engine operation. Therefore, permanent means in the form of Helmholtz liners have been employed to suppress screech. Referring again to FIG. 1, screech is controlled in accordance with the invention by providing in that part of duct 9 which is most susceptible to screech, an acoustic liner 11 of an improved Helmholtz type.

Further understanding of applicant's novel and unobvious invention will be aided by reference to FIGS. 2–7, which show prior art acoustic liners of the Helmholtz type and some of the problems encountered, heretofore, with unsteady motions in the combustion zone.

A combustion zone containing duct 13, having an acoustic liner 4 of the Helmholtz type, is shown in FIG. 2. In addition, schematically illustrated in FIG. 2 by arrows is a typical radial mode acoustic pattern. The liner 14 represents what will hereinafter be referred to as the classical concept type Helmholtz liner having, as it does, for each perforation, an associated resonant or tuned cavity 15 defined by physical partitions 16. The partitions 16 are positioned between duct 13 and the liner 14 on four sides, in surrounding relationship to perforations 17, forming a honeycomb pattern as shown in FIG. 4, which is the view taken along IV—IV. As indicated by the arrows of the acoustic patterns, flows entering and passing through the holes are isolated and absorbed in the tuned compartments 15. It is readily apparent that the classical concept acoustic liner will not only suppress radial mode screech as shown, but will also obviate transverse mode screech by the presence of physical obstacles in the form of partitions 16 which preclude crossflows from occurring.

While a classical concept liner is thus able to suppress screech in both the transverse as well as radial modes, it suffers from certain disadvantages which render it impractical in production jet propulsion systems. One such disadvantage is the high cost of manufacture associated with the requirement to physically provide a discrete tuned cavity for each perforation. Another disadvantage is the loss in efficiency of the system resulting from the added weight of the partition structure. These disadvantages led to development of the currently used liners referred to, as unpartitioned liners.

An unpartitioned liner 14' is illustrated in the combustion zone section shown in FIG. 3. The acoustic pattern schematically described by the arrows shown is radial with pressure vibrations emanating outwardly from the vicinity of the center of the combustion zone. Unlike the classical liners, unpartitioned liners do not have individual physically isolated cavities for each perforation 17'. Instead, the flows or shock waves admitted through the various perforations impact against each other on the outer side of the liner so as, in effect, to form tuned cavities behind the perforations. The manner in which the shock waves turn behind the liner so as to collide and form planes of impact are shown by the arrows in FIG. 3. The planes of impact 16' are shown as dotted lines in FIG. 3, while FIG. 5 shows the pattern of effectively tuned cavities 15' viewed along V—V.

The effectively tuned cavities 17', for reasons discussed previously, are primarily effective for suppressing radial mode screech. The unpartitioned liners are unable to stem the occurrence of crossflows which destroy the effectively tuned cavities and hence, the effectiveness of the liner itself in attenuating screech. The transverse mode acoustic paterns of FIGS. 6 and 7 show common crossflow acoustic patterns and illustrate the difficulty of establishing effectively tuned cavities in current practice unpartitioned liners.

Applicant has found that modifying unpartitioned liners to include axially extending partitions spaced at predetermined critical intervals along the circumference of the liner between it and the combustion zone containing duct can significantly enhance the effectiveness of such liners. Not only will crossflows be inhibited, but inside each elongated compartment thus formed it will be possible for effectively tuned cavities to be formed at many of the perforations.

Referring once again to FIG. 3, it will be observed that, as pressure vibrations radiate equally and simultaneously outwardly from the vicinity of the center of the combustion zone, every point in the liner experiences some pressure fluctuation. On the other hand, the acoustic patterns, schematically illustrated in FIGS. 6 and 7, necessarily include points of constant pressure in the combustion zones shown, which define diametrically extending lines. If we refer to such lines of constant pressure which extend diametrically across the cross-section of a combustion zone, as diametral nodes, FIG. 3 does not include any diametral nodes while FIGS. 6 and 7 include one and two diametral nodes, respectively. The line $n_1$—$n_1$, in FIG. 6, illustrates a diametral node. Wherever $n_1$—$n_1$, contacts liner 14′, a point of constant pressure will exist. Therefore, in the acoustic pattern shown in FIG. 6 two such points of constant pressure occur on liner 14′. Similarly, FIG. 7 shows an acoustic pattern having two diametral nodes designated $n_2$—$n_2$ which contact liner 14′ at four points. It should be noted that in keeping with the cross-sectional views illustrated in FIGS. 6 and 7 the lines $n_1$—$n_1$ and $n_2$—$n_2$ represent cross-sections of what really are planes of constant pressure. The planes of constant pressure not only extend diametrically across the zone but also along its length and the length of liner 14′. Thus, as these planes contact the associated liner 14′, they will describe not points but lines of constant pressure. However, to facilitate the discussion which follows we will continue to be referring to the cross-sectional views, as shown, in FIGS. 3, 6 and 7.

The foregoing observations indicate that under radial mode conditions the number $n$ of diametral nodes is zero, and under transverse mode conditions $n$ is equal to at least one with the actual number of diametral nodes present depending on the specific transverse mode crossflow pattern. It should not be forgotten that the crossflow patterns illustrated in FIGS. 6 and 7 are schematically shown and that in practice such patterns are constantly in a state of flux and tend to shift in orientation.

Referring once more to FIG. 6, there are basically two crossflow patterns shown and, as previously observed, one diametral node, $n_1$. By locating axially extending partitions between liner 14′ and duct 13′ at those points of constant pressure which occur on the liner 14′ where it contacts the diametral node, both crossflow patterns can be successfully blocked and screech can be thwarted. However, under random and uncontrollable conditions encountered in screech environments, phase shifts are common and a shift of 90° in the phase of the pattern of FIG. 6 would once again permit the same crossflow patterns to occur unhampered by the presence of the partitions which in such event, would no longer be located at the points of constant pressure. Therefore, applicant has inventively discovered, that instead of providing just two partitions, as might be supposed for an acoustic pattern having one diametral node, there should be provided at least four partitions at equal arc intervals, or at every 90°, around the circumference of the liner, thereby assuring blockage of the crossflows present even under uncontrollable shifting conditions. Applying this inventive approach to screech conditions having different acoustic patterns, applicant has found that the actual number of partitions required in a system increases as a multiple of four times the number of diametral nodes in the system. Furthermore, as was true for a condition of $n$ equal to one, each partition should be positioned at equidistant arc intervals around the circumference of the liner.

In other words, assuming the orientation of the acoustic patterns associated with the screech as random or uncontrollable, applicant has found that unpartitioned liners may be improved by providing partitions according to the formula $$\theta = 360°/4N$$

where $\theta$ represents the arc intervals around the liner circumference between partitions and $N$ represents the greatest number of diametral nodes anticipated in the system.

The combustion zone section of FIG. 8 illustrates screech conditions having an acoustic pattern, as indicated by the flow arrows. Under these conditions, characteristically, the greatest number of diametral nodes anticipated is two. Thus, according to applicant's inventive scheme, the minimum number of physical partitions required in this system, to effectively attenuate screech, is four times two. Under FIG. 8 conditions, eight physical partitions are required.

As illustrated in FIG. 8, an improved liner 11 according to applicant's invention has been provided. Eight axially extending partitions 27 have been located at intervals, according to applicant's formula, on the circumference of liner 11, between it and duct 9. The elongated compartments thus formed will inhibit creation of crossflows. Within each partition defined interval are several rows of perforations 12 for admitting pressure vibrations from the combustion zone. As was the case for unpartitioned liners under radial mode conditions, effective tuned cavities are also formed in the liner according to applicant's invention. Some of the elongated compartments will be pumped with pressure vibrations while others will be exhausted. In those compartments being pumped, the pressure vibrations pumping through the perforations 12 are turned and collide with each other as they exit, thus forming planes of impact around each perforation 12. This occurrence resutlts in creation of effective tuned cavities at each perforation 12 undergoing pumping. FIG. 9 illustrates the view taken along IX—IX in FIG. 8 and discloses a pattern of effectively tuned cavities 19 defined by impact planes 21 and, in the case of some of the perforations 12, by impact planes 21 in combination with physical partitions 18. Thus, applicant's inventive arrangement successfully attenuates screech particularly in the transverse mode without resort to introduction of circumferentially extending partitions, as in classical concept liners.

By the foregoing approach, applicant improves the screech attenuating effectiveness of liners without requiring separate walls for each perforation or row of perforations. The improved liners have the capability of successfully suppressing transverse mode sreech without a substantial sacrifice of the inherent weight and cost advantages of the current practice liners. Applicant's formula for determining the angular intervals between physical partitions represents the minimum required according to his invention. While closer spacing could assure the most uniform pumping and exhausting of the tuned compartments formed at each perforation, thus avoiding crossflows, such schemes only succeed in introducing the inherent disadvantages of classical liners (i.e., liners of the type shown in FIG. 2), specifically increased weight and loss in engine efficiency, as well as increased cost of manufacture. Applicant believes that his formula for determining the angular intervals between partitions represents the surest way to attenuate or eliminate radial and transverse mode screech without sacrificing the relative inexpensiveness and system-wise efficiency of current practice acoustic liners.

By this invention, applicant has provided means for effectively eliminating or attenuating transverse mode as well as radial mode screech. While the invention has been discussed principally in connection with the afterburner section of a jet engine, it is not to be considered as limited thereto, and is applicable to any part of a jet propulsion system susceptible to screech. The screech attenuating means herein defined by applicant is installed permanently in the system and is not dependent for its effectiveness on the fluid flow and combustion variables in the system. Thus, by relatively simple and inexpensive improvements to existing screech attenuating means, the detrimental effects of screech are effectively avoided.

While only a particular embodiment of the invention has been shown, other forms may occur to those skilled in the art. It is, therefore, to be understood that it is intended to cover all modifications and embodiments of the invention, as may fall within the true spirit and scope of the invention.

What is claimed as new and is desired to secure by Letters Patent of the United States is:

1. In a jet propulsion system including a duct containing a combustion zone, means for attenuating screech mounted on the interior of said duct and extending approximately the length of said zone, said means comprising:
   a liner in said duct,
   a plurality of perforations located in said liner, and
   a plurality of axially extending elongated partitions located at predetermined intervals between said liner and said duct and forming with said duct and said liner elongated segregated compartments extending substantially the length of the duct, said perforations and said partitions cooperating to prevent the buildup of high intensity pressure oscillations which produce screech noise in said jet propulsion system.

2. Screech attenuating means as defined in claim 1 wherein said predetermined intervals between said partitions is a function of the greatest number of diametral nodes anticipated in the pulsating mode of said combustor zone.

3. In a gas turbine engine assembly, a duct containing a combustion zone including screech attenuating means, wherein said means comprises:
   a generally cylindrically shaped internally positioned liner for said duct;
   a plurality of openings arranged in rows located in the forward portion of said liner in the area of greatest temperature, and
   a plurality of elongated partitions, said partitions located at predetermined intervals from each other between rows of said openings and extending axially between said liner, and said duct, thereby forming elongated segregated compartments, and said partitions and said openings cooperating to attenuate screech produced by pressure pulsations in said combustor zone of said axial flow turbine machine.

4. Screech attenuating means as defined in claim 3 wherein said partitions are spaced from each other at angular intervals of $\theta$ between said liner and said duct, said intervals being determined by the formula $$\theta = 360°/4N$$

where N represent the maximum number of diametral nodes normally produced by pressure pulsations in said combustor zone.

5. In a gas turbine engine assembly, a combustion zone positioned within a duct:
   said duct containing said combustion zone having means for suppressing screech produced by pressure oscillations in said combustor zone during operation of said gas turbine assembly, wherein
   said means comprises an elongated acoustic liner mounted inside said duct,
   said liner having a plurality of openings arranged in axially extending rows located in the forward portion of said liner in that area of the combustor zone having generally the greatest temperatures;
   a plurality of elongated partitions extending axially between said liner and said duct at predetermined equal intervals,
   said partitions also extending intermediate said rows of holes spaced in rows at said equal intervals,
   so that said partitions and said holes cooperate to prevent the buildup of high intensity pressure oscillations which cause screech noise to emanate from said combustion zone.

6. A combustion zone as recited in claim 5 wherein said partitions are spaced circumferentially between said liner and said duct at angular intervals of a full circle divided by four times the maximum number of diametral nodes normally produced in said combustor zone.

7. In a gas turbine engine assembly having sound suppression means wherein said means comprise:
   an elongated acoustic liner mounted in said gas turbine engine,
   said liner having a plurality of openings or holes arranged in axially extending rows,
   a plurality of elongated partitions extending axially at predetermined equal intervals,
   said partitions also extending intermediate said rows of openings or holes spaced in rows at said equal intervals,
   so that said partitions in said holes cooperate to prevent the build-up of high intensity pressure oscillations which cause screech noise.

8. A sound suppression means as recited in claim 7 wherein said partitions are spaced circumferentially around said liner at angular intervals of a full circle divided by four times the maximum number of diametral nodes normally found within the gas turbine engine.

References Cited

UNITED STATES PATENTS

| 2,543,461 | 2/1951 | Latulippe. |
| 3,041,836 | 7/1962 | Truman et al. |

FOREIGN PATENTS

| 1,000,188 | 1/1957 | Germany. |
| 935,119 | 8/1963 | Great Britain. |

ROBERT S. WARD, JR., *Primary Examiner.*